United States Patent [19]

Hutzel

[11] Patent Number: 4,699,527
[45] Date of Patent: Oct. 13, 1987

[54] ANGULAR CONTACT BALL BEARING WITH AN OUT-OF-ROUND RIM AND METHOD FOR ASSEMBLING SAME

[75] Inventor: Bernhard Hutzel, Neunkirchen, Fed. Rep. of Germany

[73] Assignee: Schaeffler Walzlager GmbH, Homburg, Bad Homburg, Fed. Rep. of Germany

[21] Appl. No.: 814,569

[22] Filed: Dec. 30, 1985

[30] Foreign Application Priority Data

Jan. 31, 1985 [DE] Fed. Rep. of Germany ....... 3503215

[51] Int. Cl.⁴ ..................... F16C 19/14; F16C 33/58; F16C 43/08
[52] U.S. Cl. .................................. 384/510; 384/513; 384/516; 384/615; 384/617; 29/148.4 A; 29/453
[58] Field of Search .............. 29/148.4 R, 148.4 A, 29/148.4 B, 453; 384/490, 447, 510, 513, 516, 537, 539, 559, 560, 569, 584, 617, 615, 516, 456, 609, 590, 620, 511

[56] References Cited

U.S. PATENT DOCUMENTS

| 818,734 | 4/1906 | Blin | 29/148.4 A X |
| 942,392 | 12/1909 | Koch | 29/148.4 A X |
| 2,633,627 | 4/1953 | Olmstead | 29/148.4 A |
| 3,783,482 | 1/1974 | Kunert et al. | 29/148.4 A |

Primary Examiner—Stuart S. Levy
Assistant Examiner—David Werner
Attorney, Agent, or Firm—Bierman & Muserlian

[57] ABSTRACT

An angular contact ball bearing consisting of an inner race and an outer race, each of which contains at least one ball track in which a ring of balls rolls, at least one ball track of one race being bounded by a high rim on one side and by a low rim on the opposite side, characterized in that the low rim (8,10,24,25,28,29,43,53) on one of the races (1,2,14,17,18,35,46) has an out-of-round contour having a number of higher portions (11,30) and lower portions (12,31), the lower portions (12,31) leading preferably steplessly into the lowest point of the ball track (3,4,15,16,19,20,39,49), the out-of-round contour being such that the enveloping contour of the higher portions (11,30) of the rim (8,10,24,25,28,29,43,53) corresponds to the enveloping contour of the balls (5,21,22,33,44) disposed in the other race (1,2,14,17,18,36,47) when one of the races (1,2,14,17,18,36,47) is subjected to elastic out-of-round deformation by the action of pressure.

9 Claims, 13 Drawing Figures

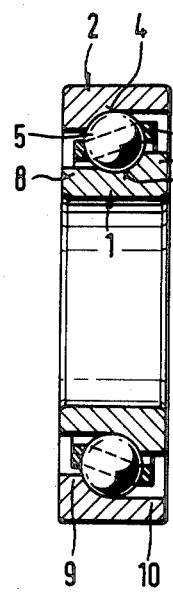
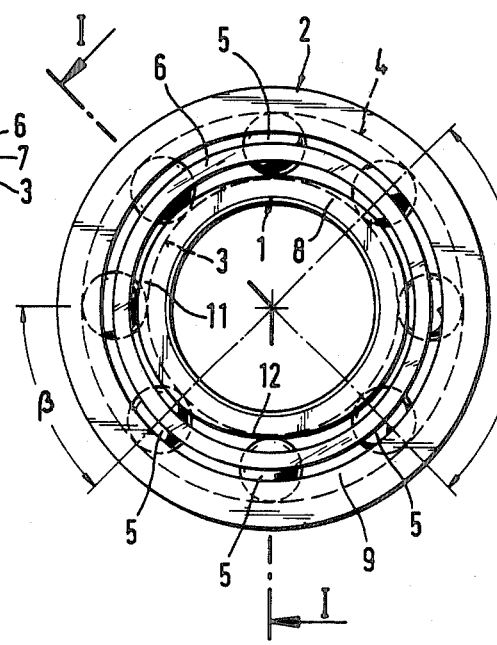
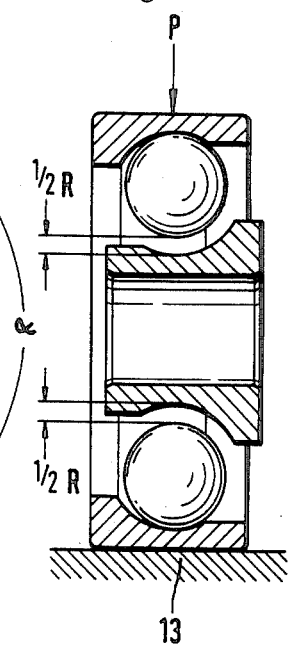
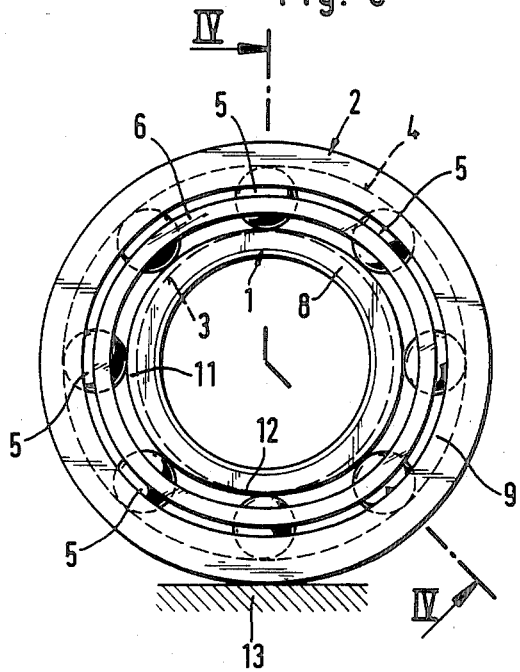
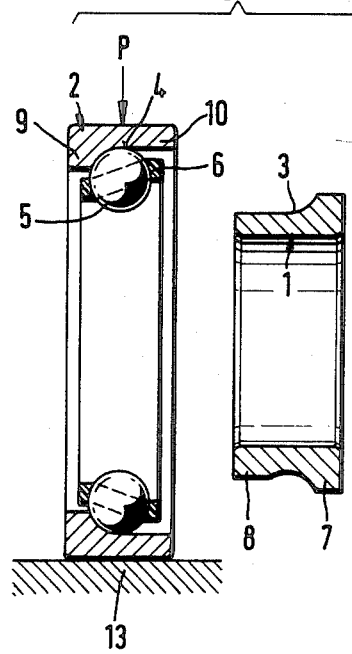

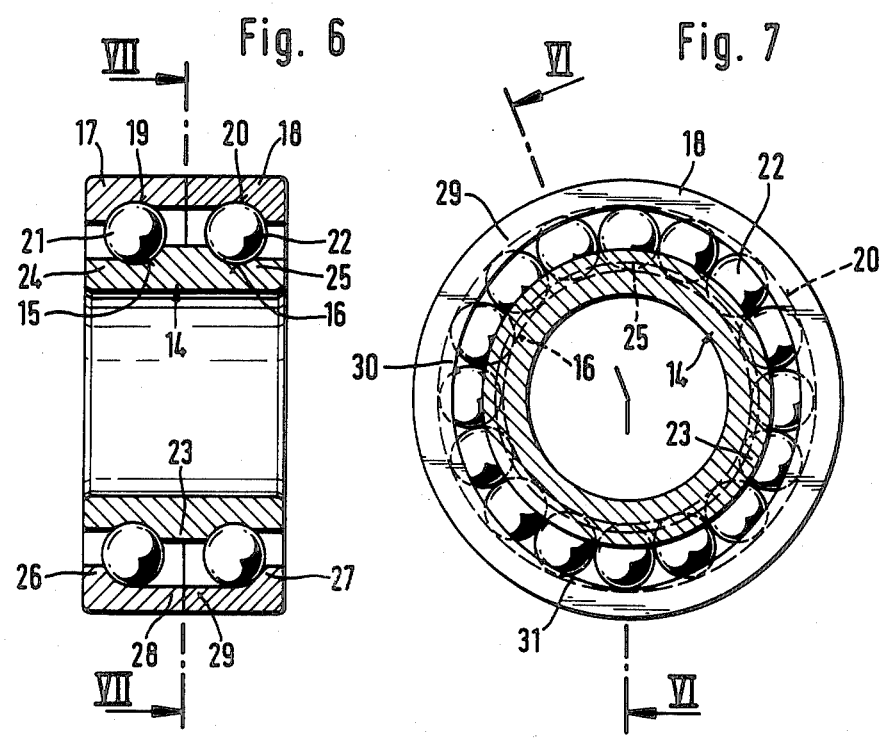
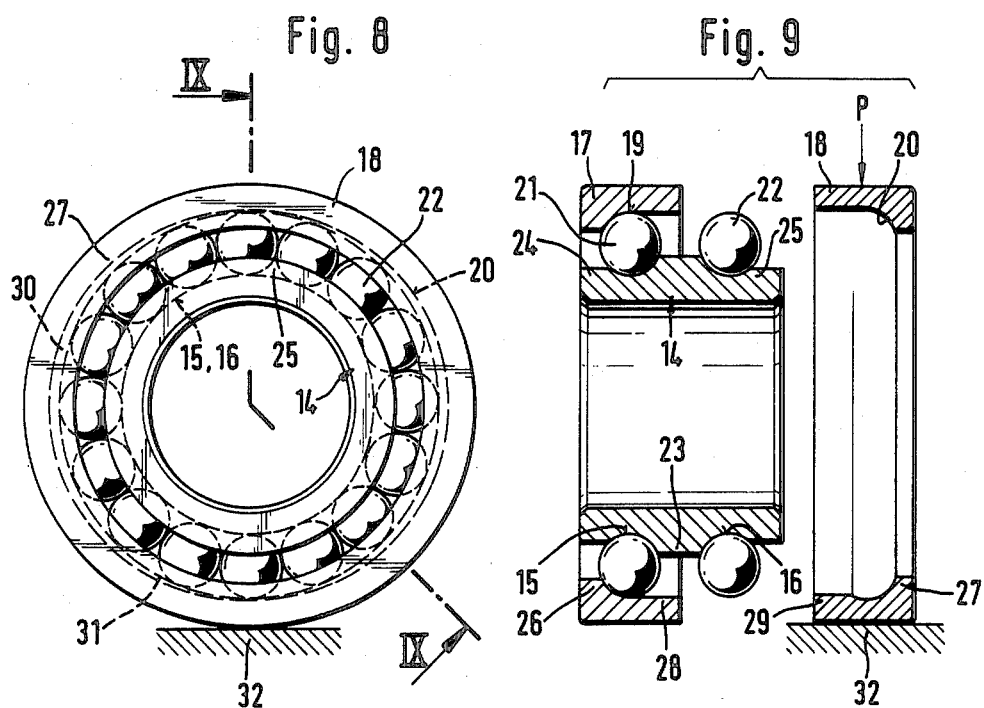

ANGULAR CONTACT BALL BEARING WITH AN OUT-OF-ROUND RIM AND METHOD FOR ASSEMBLING SAME

STATE OF THE ART

To facilitate the handling of angular contact ball bearings consisting of an inner race and an outer race, each of which contains at least one ball track in which a ring of balls rolls, at least one ball track of one race being bounded by a high rim on one side and by a low rim on the opposite side during installation, it is desirable that they should be connected to form an inseparable modular unit after assembly.

In a known angular contact ball bearing of this type, the low rim of the outer race has for this purpose a diameter which is slightly smaller than that of the outer enveloping circle of the ring of balls. For assembly, the ring of balls is inserted into the ball track of the inner race where it is fixed by means of a cage or some other suitable means. The outer race is then expanded by heating until it can be pushed axially with the low rim over the ring of balls situated in the inner race. After cooling, the outer race is connected to the inner race by the balls to form an inseparable modular unit. This type of assembly is unsatisfactory, however, when other operations have to be carried out subsequently, such as, for example, greasing the bearing or fitting gaskets. For these purposes, it is necessary first to wait until the bearing has re-cooled, and this means a considerable disturbance to the working cycle.

OBJECTS OF THE INVENTION

It is an object of the invention to provide an angular contact ball bearing which in simple manner forms a self-supporting modular unit.

It is another object of the invention to provide a method of assembling an angular contact ball bearing in which there is no need to heat the outer race, with the result that subsequent operations can be carried out without any delay.

These and other objects and advantages of the invention will become obvious from the following detailed description.

THE INVENTION

In the angular contact ball bearing of the invention, the low rim on one of the races has an out-of-round contour having a number of higher and lower portions, the lower portions leading preferably steplessly into the lowest point of the ball track, the contour being so out-of-round that the enveloping contour of the higher portions of the rim corresponds to the enveloping contour of the balls disposed in the other race when one of the races is subjected to elastic out-of-round deformation by the action of pressure, under the following conditions:

(a) the amount by which the said one race is subjected to out-of-round deformation corresponds, at the point where the pressure acts, to at maximum half the radial clearance of the angular contact ball bearing, (b) the amount by which the higher portions of the out-of-round rim surmount the lowest point of the ball track is larger than half the radial clearance of the angular contact ball bearing and corresponds at maximum to the su of half the radial clearance of the angular contact ball bearing and the amount by which the said one race is subjected to out-of-round deformation at the point where the pressure acts, and (c) at least one higher portion of the out-of-round rim extends circumferentially over an angle larger than the angle included between two adjacent balls.

The term "radial clearance" means the dimension resulting when the center-points of the ball tracks of the inner race and the outer race are situated in one plane and the races in this position are displaced radially from one end position to the other in relation to one another.

To assemble an angular contact ball bearing of this kind, according to one embodiment of the method of the invention, the balls are inserted into the race other than the one provided with the out-of-round low rim, whereupon one of the races is subjected to elastic out-of-round deformation by the application of pressure until the enveloping contour of the balls and that of the higher portions of the out-of-round low rim correspond to one another, and then the races are so aligned in relation to one another in respect of their angular position that they can be introduced axially one inside the other, after which the pressure action is discontinued.

According to another embodiment of the method, to assemble a two-row angular contact ball bearing of this kind, a ring of balls is introduced into the track having the rims on both sides in each race, one of the races is then subjected to elastic out-of-round deformation by the action of pressure until the enveloping contour of the balls facing the out-of-round rim and that of the higher portions of the low out-of-round rim correspond to one another, and then the races are aligned in relation to one another in respect of their angular position so that they can be introduced axially one inside the other, whereupon they are inserted one inside the other, and then the pressure action is discontinued.

The low rim construction of the invention provides reliable cohesion of the angular contact ball bearing by simple means since the higher portions of the out-of-round low rim and the balls overlap radially when the action of pressure is released or discontinued. With the method of the invention for assembling an angular contact ball bearing of this kind, it is particularly advantageous in that heating of the outer race is eliminated so that subsequent operations can be carried out immediately after assembly.

In the simplest case, it is possible for the out-of-round low rim to have only one higher portion if the same is larger in the circumferential direction than the angle included between two adjacent balls. Nor is it absolutely essential for the contour of the out-of-round low rim to be identical to the enveloping contour of the balls inserted in the ball track of the other race provided that care is taken to ensure, by the action of pressure, at two or more places of the said one race that the enveloping contour of the higher portions of the out-of-round rim corresponds to the enveloping contour of the balls to such an extent that the races can be inserted axially one inside the other. The angular contact ball bearing of the invention may be constructed with a full complement of balls or may be provided with a cage. Alternatively, the angular contact ball bearing may have more than two rings of balls.

According to one embodiment of the invention, the low rim having the out-of-round contour is disposed on the inner race but in another embodiment of the invention, the low rim having the out-of-round contour may be disposed on the outer race.

In either case, assembly of the angular contact ball bearing can be carried out by leaving the race having the out-of-round low rim undeformed, while the other race containing the balls in its ball track is subjected to out-of-round deformation such that the enveloping contour of the balls corresponds to the enveloping contour of the higher portions of the out-of-round low rim. Alternatively, the race having the out-of-round low rim may be subjected to out-of-round deformation such that the enveloping contour of the higher portions of the out-of-round low rim is circular to correspond to the enveloping contour of the balls disposed in the other race not subjected to deformation.

In one particularly advantageous embodiment of the invention, the out-of-round contour of the low rim has approximately the shape of an ellipse which contour can be produced very easily and requires only little outlay even on assembly of the bearing, since it is sufficient for the pressure to act at two places on the race requiring to be subjected to deformation.

In another embodiment of the invention, the angular contact ball bearing has two rings of balls, the race having the out-of-round low rims being divided between the rings of balls in a plane extending transversely to the axis. The advantage of this is that it is possible to assemble by the proposed method both two-row angular contact ball bearings of X and of 0 type construction.

According to another aspect of the invention, the angular contact ball bearing comprises two rings of balls to take radial forces and unilateral axial forces, the said balls being received in one-part races, at least the inner enveloping circles of the rings of balls being different and at least one ball track of the outer race being bounded by high rims on both sides, while the ball tracks of the inner race have high rims only on those sides which are subjected to the axial force and the out-of-round low rim is provided on the inner race.

Finally, the angular contact ball bearing of the invention comprises two rings of balls to absorb radial forces and unilateral axial forces, the said balls being received in one-part races on a common reference diameter, one ball track in the outer race and the other ball track in the inner race each having a low rim and a high rim on their opposite sides at the outer ends of the races remote from the axial force, while the other ball tracks are bounded by high rims on both sides. The said construction of the races enables two-row angular contact ball bearings with undivided races also to be easily connected to form an inseparable modular unit when one of these races has an out-of-round low rim.

Referring now to the drawings:

FIG. 1 is a cross-section of an angular contact ball bearing of the invention on the line I—I in FIG. 2 and FIG. 2 is an end elevation of the bearing of FIG. 1.

FIG. 3 is an end elevation of the bearing of FIGS. 1 and 2 with the outer race having been subjected to out-of-round deformation.

FIG. 4 is a cross-section on the line IV—IV in FIG. 3.

FIG. 5 is a longitudinal cross-section through an angular contact ball bearing having a radial clearance shown on an exaggerated scale.

FIG. 6 is a cross-section of a two-row angular contact ball bearing on the line VI—VI in FIG. 7 and FIG. 7 is a cross-section on the line VII—VII in FIG. 6.

FIG. 8 is an end elevation of the bearing shown in FIGS. 6 and 7 with an outer race subjected to out-of-round deformation and FIG. 9 is a cross-section on the line IX—IX in FIG. 8.

Figure 10:
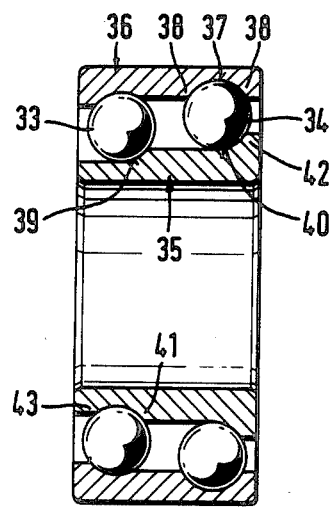
FIG. 10 is a longitudinal cross-section through a two-row angular contact ball bearing with one-part races.

Referring to FIGS. 1 to 4, the angular contact ball bearing comprises inner race 1 and outer race 2, each of which contains a ball track 3 and 4 respectively, in which rolls a ring of balls 5 held in spaced relationship in a cage 6. Ball track 3 of inner race 1 is bounded by a high rim 7 on one side and by a low rim 8 on the opposite side, while ball track 4 of outer race 2 is bounded by a high rim 9 on one side and by a low rim 10 on the opposite side.

On inner race 1, low rim 8 is provide with an out-of-round contour in the form of an ellipse which has higher portions 11 and lower portions 12, the latter leading steplessly into the lowest point of ball track 3, and the amount by which higher portions 11 of out-of-round rim 8 surmount the lowest point of ball track 3 is larger than half the radial clearance of the angular contact ball bearing and corresponds at most to the sum of half the radial clearance of the angular contact ball bearing and the amount by which race 2 is subjected to out-of-round deformation at the point where the pressure acts on assembly. The out-of-round contour of rim 8 is shown on a highly exaggerated scale in the drawings while the radial clearance is disregarded.

As shown in FIG. 2, higher portions 11 extend over an angle $\alpha$ which in the circumferential direction is larger than angle $\beta$ included between two adjacent balls 5. As a result of this construction, higher portions 11 of rim 8 radially overlap three balls 5 at a time in the exemplified embodiment illustrated to such an extent that the angular contact ball bearing is connected to form a self-supporting modular unit.

To assemble the angular contact ball bearing as shown in FIG. 4, balls 5 spaced apart in cage 6 are inserted into ball track 4 of outer race 2, whereupon outer race 2, which is supported on an indicated support 13, is subjected to elastic out-of-round deformation by the action of pressure in the direction of the arrow P until the enveloping contour of balls 5 and that of higher portions 11 of low rim 8 correspond to one another. The amount by which race 2 is subjected to out-of-round deformation may, as shown in FIG. 5, correspond, at the point where the pressure acts, to at maximum half the radial clearance of the angular contact ball bearing. As shown in FIG. 3, races 1 and 2 are then so aligned in relation to one another in respect of their angular position as to be introducible axially one inside the other. Inner race 1 is then inserted axially into out-of-round outer race 2 provided with balls 5, whereupon the action of pressure is discontinued and races 1 and 2 assume the position shown in FIG. 2.

FIGS. 6 to 9 show a two-row angular contact ball bearing consisting of inner race 14 with ball tracks 15 and 16 and two outer race halves 17 and 18, each of which contains a ball track 19 and 20 respectively, in which two rings of balls 21 and 22 respectively roll. Inner race 14 has a rim 23 between the rings of balls 21 and 22 and rims 24 and 25 at its outer ends, the contour of rings 24 and 25 being circular as shown in FIG. 8.

At their outer ends, outer race halves 17 and 18 have high rims 26 and 27 respectively, while low rims 28 and 29 respectively are disposed between the rings of balls 21 and 22. As shown in FIG. 7, low rims 28 and 29 of outer race halves 17 and 18 have the out-of-round contour in the form of an ellipse which has higher portion 30 and lower portions 31. Here again, the bearing is held together by the radial overlap between higher portions 30 and balls 21 and 22.

A modification of the above-described method of assembly will be described with reference to FIGS. 7 to 9, one outer race half 17 having already been assembled in the latter drawing. The ring of balls 22 is placed in ball track 16 where it is retained on race 14 in known manner, for example, by means of grease. As shown in FIGS. 7 and 8, rim 25 of inner race 14 has a circular contour. On the other hand, outer race half 18 has low rim 29 with an out-of-round contour in the form of an ellipse which has higher portions 30 and lower portions 31. As shown in FIG. 9, race half 18 is then supported on an indicated support 32 and subjected to out-of-round deformation by the action of pressure in the direction of arrow P until the out-of-round contour of low rim 29 assumes a circular shape and corresponds to the enveloping contour of the ring of balls 22 as shown in FIG. 8. Here again the amount of which race half 18 is deformed corresponds, at the point where the pressure acts, to at maximum half the radical clearance of the angular contact ball bearing. The remainder of the assembly operation is then as described above.

Figure 11:
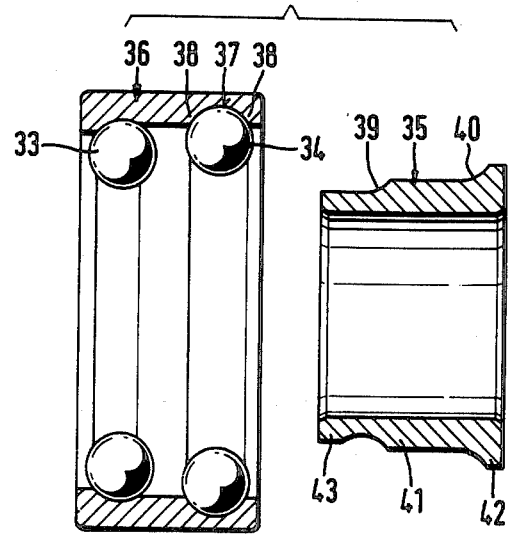
FIG. 11 is a section similar to FIG. 4.

FIGS. 10 and 11 illustrated an angular contact ball bearing comprising two rings of balls 33 and 34 received in one-part races 35 and 36, the inner enveloping circles of balls 33 and 34 being different. Ball track 37 of race 36 is bounded by high rims 38 on both sides, while ball tracks 39 and 40 of inner race 35 have high rims 41 and 42 only at the sides subjected to the axial force. The out-of-round low rim 43 is provided on inner race 35.

As shown in FIG. 11, to assemble the angular contact ball bearing as in the method described in connection with FIG. 4, the rings of balls 33 and 34 are placed in outer race 36 which is then subjected to out-of-round deformation in the manner described until inner race 35 is axially introducible into outer race 16.

Figure 12:
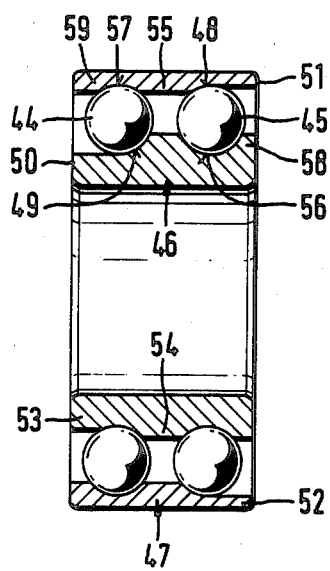
FIG. 12 is a longitudinal cross-section through another embodiment of a two-row angular contact ball bearing and FIG. 13 is a section similar to FIG. 4.
Figure 13:
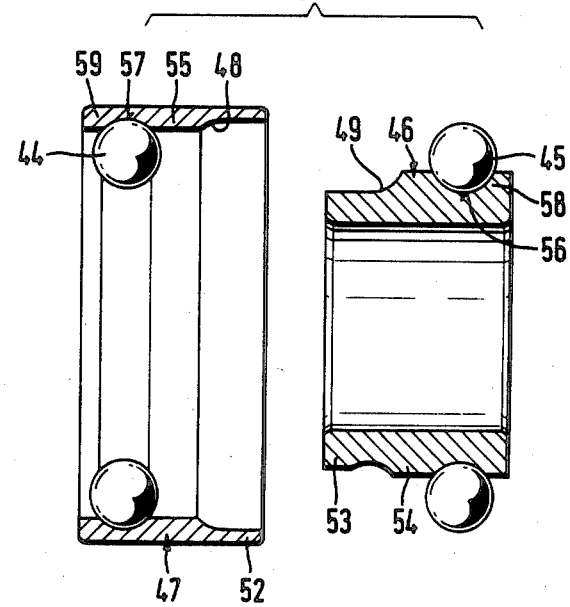

The angular contact ball bearing shown in FIGS. 12 and 13 comprises two rings of balls 44 and 45 received on a common reference diameter in one-part races 46 and 47, one track 48 in outer race 47 and the other track 49 in inner race 46 each having a low rim 52 and 53 respectively at outer ends 50 and 51 respectively of races 46 and 47 remote from the axial force, while a high rim 54 and 55 respectively is provided at their opposite sides. The other ball tracks 56 and 57, on the other hand, are bounded by high rims 58 and 59 on both sides. In this exemplified embodiment too, low rim 53 on inner race 46 is out-of-round.

To assemble the angular contact ball bearing as shown in FIG. 13, a ring of balls 44 is placed in ball track 57 of outer race 47 which is bounded by high rims 59 on both sides, and a ring of balls 45 is placed in track 56 of inner race 46, which is also bounded by high rims 58 on both sides, whereupon race 47 is subjected to out-of-round deformation in the manner described until the enveloping contour of balls 44 facing out-of-round rim 53 and higher portions of low out-of-round rim 53 correspond to one another similarly. The above-described method steps apply to the remainder of the assembly operation.

Various modifications of the bearings and method of the invention may be made without departing from the spirit or scope thereof and it is to be understood that the invention is intended to be limited only as defined in the appended claims.

What I claim is:

1. An angular contact ball bearing consisting of an inner race and an outer race, each race containing at least one ball track in which a ring of balls rolls, at least one ball track of one race being bounded by a high rim on one side and by a low rim on the opposite side, characterized in that the low rim (8,10,24,25, 28,29,43,53) on one of the races (1,2,14,17,18,35,46) has an out-of-round contour having a number of higher portions (11,30) and lower portions (12,31), the lower portion of the out-of-round contour (12,31) leading preferably steplessly into the lowest portion of the ball track (3,4,15,16,19,20,39, 49), the out-of-round contour being such that the enveloping contour of the higher portions (11,30) of the low rim (8,10,24, 25,28,29,43,53) corresponds to the enveloping contour of the balls (5,21,22,33,44) disposed in the outer race (1,2,14,17,18, 36,47) when one of the races (1,2,14,17,18,36,47) is subjected to elastic out-of-round deformation by the action of pressure, under the following conditions:

(a) the amount by which the said one race (1,2,14,17,18,36,47) is subjected to out-of-round deformation corresponds, at the point where the pressure acts, to at maximum half the radial clearance of the angular contact ball bearing, (b) the amount by which the higher portion (11,30) of the out-of-round rim (8,10,24,25,28,29,43,53) surmount the lowest point of the ball track (3,4,15,16,19,20,39,49) is larger than half the radial clearance of the angular contact ball bearing and corresponds at maximum to the sum of half the radial clearance of the angular contact ball bearing and the amoaunt of which the said one race (1,2,14,17,18,36,47) is subjected to out-of-round deformation at the point where the pressure acts, and (c) at least one higher portion (11,30) of the out-of-round rim (8,10,24,25,28,29,43,53) extends circumferentially over an angle larger that the angle included beetween two adjacent balls (5,21,22,33,34).

2. An angular contact ball bearing of claim 1 wherein the low rim (8,24,25,43,53) having the out-of-round contour is disposed on the inner race (1,14,35,46).

3. An angular contact ball bearing of claim 1 wherein the low rim (10,28,29) having the out-of-round contour is disposed on the outer race (2,17,18).

4. An angular contact ball bearing of claim 1 wherein the out-of-round contour of the low rim (8,10,28,29,43,53) has approximately the shape of an ellipse.

5. An angular contact ball bearing of claim 1 comprising two rings of balls (21,22), the race (17,18) with the low rims (28,29) being divided between the rings of balls (21,22) in a plane extending transversely to the axis.

6. An angular contact ball bearing of claim 1 comprising two rings of balls (33,34) to take radial forces and unilateral axial forces, the said balls being received in one-part races (35,36), at least the inner enveloping circles of the rings of balls (33,34) being different and at least one ball track (37) of the outer race (36) being bounded by high rims (38) on both sides, while the ball tracks (39,40) of the inner race (35) have high rims (41,42) only on those sides which are subjected to the axial force and the out-of-round low rim (43) is provided on the inner race (35).

7. An angular contact ball bearing of claim 1 comprising two rings of balls (44,45) to take radial forces and unilateral axial forces, the said balls being received in one-part races (46,47) on a common reference diameter, one ball track (48) in the outer race (47) and the other ball track (49) in the inner race (46) each having a low rim at the outer ends (50,51) of the races (46,47) remote from the axial force and a high rim (54,55) on their opposite sides while the other ball tracks (56,57) are bounded by high rims (58,59) on both sides.

8. A method of assembling an angular contact ball bearing consisting of an inner race and an outer race, each race containing at least one ball track in which a ring of balls rolls, at least one ball track of one race being bounded by a high rim on one side and by a low rim on the opposite side, characterized in that the low rim (8,10,24,25,28,29,43,53) on one of the races (1,2,14,17,18, 35,46) has an out-of-round contour having a number of higher portions (11,30) and lower portions (12,31), the lower portion of the out-of-round contour (12,31) leading preferably steplessly into the lowest portion of the ball track (3,4,15, 16,19,20,39,49), the out-of-round contour being such that the enveloping contour of the higher portions (11,30) of the low rim (8,10,24,25,28,29,43,53) corresponds to the enveloping contour of the balls (5,21,22,33,44) disposed in the outer race (1,2,14,17,18,36,47) when one of the races (1,2,14,17,18,36,47) is subjected to elastic out-of-round deformation by the action of pressure comprising inserting balls (5,21,22,33,34) into the race (1,2,14,17,18,36) other than the one provided with the out-of-round low rim, subjecting one of the races (1,2,14,17,18,36) to elastic out-of-round deformation by the application of pressure until the enveloping contour of the balls (5,21,22,33) and that of the higher portions (11,30) of the out-of-round low rim (8,10,24,25,28,29,43) correspond to one another, and aligning the races (1,2,14,17,18,35,36) in relation to one another in respect to their angular position so that they can be introduced axially one inside the other whreupon they are inserted one inside the other, whereafter the pressure action is discontinued.

9. A method of assembling an angular contact ball bearing consisting of an inner race and an outer race, two rings of balls (44,45) to receive radial forces and unilateral axial forces, the said balls being received in one-part races (46,47) on a common reference diameter, one ball track (48) in the outer race (47) and the other ball track (49) in the inner race (46) each having a low rim at the outer end (50,51) of the races (46,47) remote from any axial force and a high rim (54,55) on their opposite sides while the other ball tracks (56,57) in the outer race and inner race are bounded by high rims (58,59) on both sides, characterized in that the low rim (53) on the inner rade (46) has an out-of-round contour having a number of higher portions and lower portions, the lower portions of the out-of-round contour leading preferably steplessly into the lowest portion of the ball track (49), the out-of-round contour being such that the enveloping contour of the higher portions of the low rim (53) corresponds to the enveloping contour of the balls (44) disposed in the outer race when one of the races is subjected to elastic out-of-round deformation by the action of pressure, comprising introducing the ring of balls (44,45) into the track (56,57) having the high rims (58,59) on both sides in each race (46,47), subjecting one of the races (46,47) to elastic out-of-round deformation by the action of pressure until the enveloping contour of the balls (44) facing the out-of-round rim (53) and that of the higher portions of the low out-of-round rim (53) correspond to one another, and aligning the races (46,47) in relation to one another in respect of their angular position so that they can be introduced axially one inside the other, whereupon they are inserted on inside the other whereafter the pressure action is discontinued.

* * * * *